United States Patent [19]

Barry et al.

[11] Patent Number: 5,077,823
[45] Date of Patent: Dec. 31, 1991

[54] ELECTRIC MOTOR STARTING CIRCUIT

[75] Inventors: Robert M. Barry; James R. Hilmanowski, both of St. Paul, Minn.

[73] Assignee: CFR Corporation, Roseville, Minn.

[21] Appl. No.: 593,751

[22] Filed: Oct. 5, 1990

[51] Int. Cl.⁵ .............................................. H02P 5/16
[52] U.S. Cl. .................................. 388/819; 388/919; 388/933
[58] Field of Search ............... 318/819, 831, 919, 933, 318/820

[56] References Cited

U.S. PATENT DOCUMENTS

| | | |
|---|---|---|
| 3,327,196 | 6/1967 | Sahrbacker . |
| 3,355,650 | 11/1967 | Tolmie .................. 388/830 |
| 3,402,338 | 9/1968 | Thoresen ................. 388/830 |
| 3,458,793 | 7/1969 | Tsergas . |
| 3,475,677 | 10/1969 | Swinehart et al. ......... 388/831 |
| 3,634,874 | 1/1972 | Mason . |
| 3,678,360 | 7/1972 | Minarik et al. . |
| 4,112,342 | 9/1978 | Elliott ...................... 318/599 |

Primary Examiner—David Smith, Jr.
Attorney, Agent, or Firm—John W. Adams

[57] ABSTRACT

The invention provides a cushioning control circuit which restricts the initial flow of current to a D.C. permanent magnet motor by providing a neon control lamp in series with a pair of triac control circuits which drops the initial voltage imposed on the motor windings.

14 Claims, 1 Drawing Sheet

ELECTRIC MOTOR STARTING CIRCUIT

BACKGROUND OF THE INVENTION

I. Field of the Invention

This invention relates to a method of starting a high efficiency permanent magnet direct current motor.

II. Discussion of the Prior Art

Prior art methods of starting permanent magnet motors often provide the dangerous capability of demagnetizing the magnet motors where the on-off switch to the motor circuit is normally controlled by a triac motor control switching unit. Rapid movement of the main control switch may energize the triac circuit in rapid on-off succession which could impose maximum initial start-up voltage on the motor and thereby cause demagnetizing current to flow to the motor. These motors, particularly high efficiency models, produce maximum torque at locked rotor conditions and consequently have high inrush amperes capable of demagnetizing their magnets.

SUMMARY OF THE INVENTION

One aspect of the present invention provides a cushioning control circuit which restricts the initial flow of current to the motor by providing a neon control lamp in series with a pair of triac control circuits which drops the initial voltage imposed on the motor windings.

It is an object of the invention to provide a means of softly starting a permanent magnet DC motor.

It is yet another object of the invention to provide a means of lowering the applied voltage to the DC motor for a time of sufficient duration to allow the motor to begin to rotate.

It is yet another object of the invention to increase the applied voltage after the motor has reached a sufficient speed to eliminate any damaging inrush currents.

It is yet another object of the invention to prevent a full DC voltage from reaching the motor by controlling a bidirectional triode thyristor, triac and diac.

Yet another object of the invention is to use a lamp and photocell to control the voltage or soft start of a permanent magnet motor to provide isolation from the power handling devices.

Yet another object of the invention is to provide a soft start motor capability through a unique latching lamp and photocell timing circuit.

Another object of the invention is to provide a means of remote controlling the power to a soft start permanent magnet motor system.

Still another object of the invention is to provide a means of starting a permanent magnet motor including a photocell and resistor parallel circuit for controlling the conductance of a triac device wherein the photocell and resistor combine to present a first resistance value in the soft start mode and a second resistance value when the photocell is illuminated thereby allowing the triac device to fully conduct and apply normal running voltage to the motor.

Another aspect of the present invention provides a "soft" start mode for the initial time after a permanent magnet DC motor is switched on. The applied voltage at the time of start-up is lowered for a time duration to allow the motor to begin to rotate. After the motor has reached sufficient revolutions per minute, the applied voltage is increased to the normal operating voltage eliminating any damaging current.

The foregoing features, objects and advantages of the invention will become apparent to those skilled in the art from the following detailed description of a preferred embodiment, especially when considered in conjunction with the accompanying drawings in which like numerals in the several views refer to corresponding parts.

DESCRIPTION OF THE DRAWINGS

The sole figure is a schematic diagram of the voltage supply circuit of the method of the invention.

DESCRIPTION OF THE PREFERRED EMBODIMENT

Figure 1:
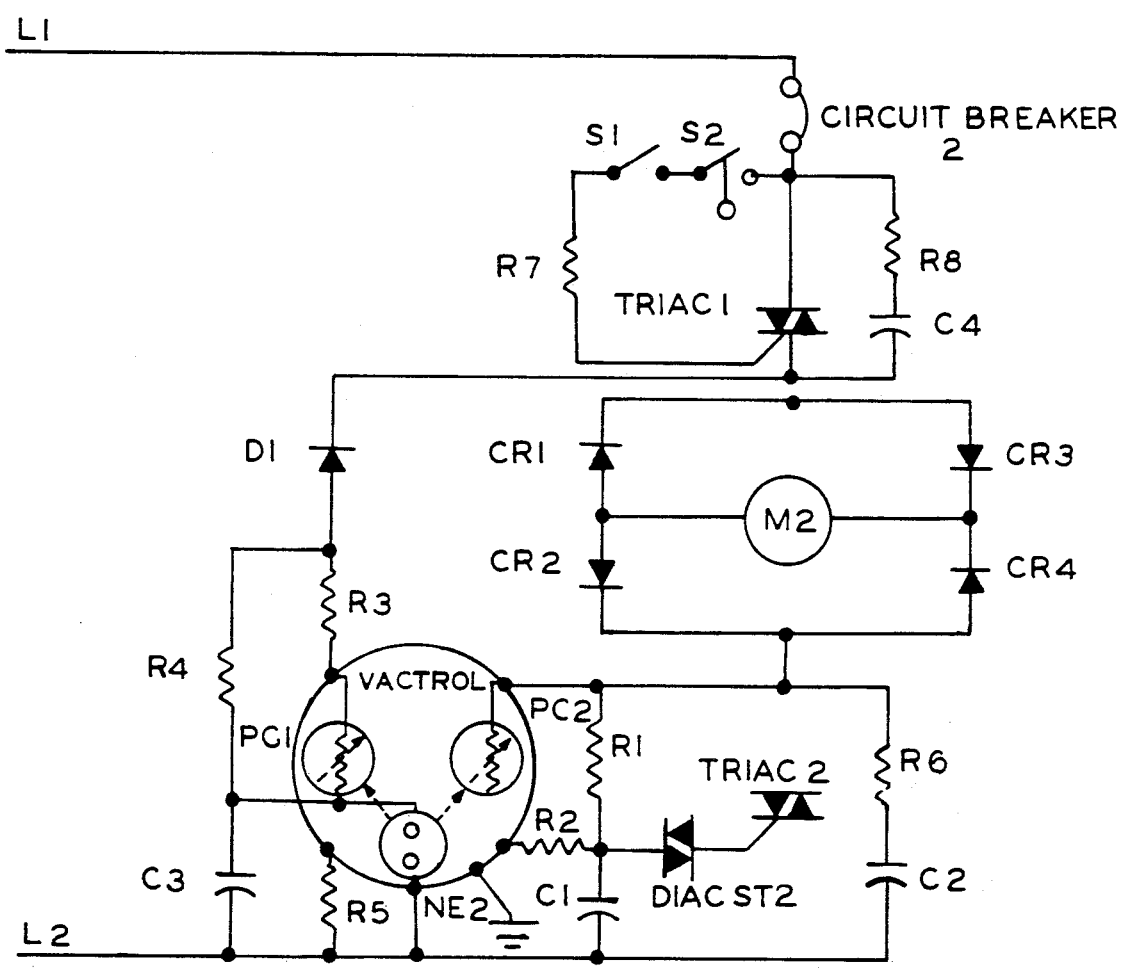

Referring now to the sole figure, a schematic diagram of one embodiment of the invention is shown. The full DC start voltage is prevented from reaching the motor by controlling a bidirectional triode thyristor, triac 1, and diac ST2. A diac is a bidirectional diode thyristor. The degree of voltage reduction to motor M2 is determined by a timing network consisting of resistor R1 and capacitor C1. This constitutes a phase controlled network well known in the prior art. Resistor R6 and capacitor C2 provide a protective circuit to control the change of voltage with respect to time.

Motor M2 would continue to run at this preset "soft" start voltage determined by the timing network R1 and C1 as long as R1 and C1 were left unchanged. Once the motor M2 has begun to rotate, however, current to the motor is reduced because of back electro motive-force and full voltage can now be supplied safely.

The present invention provides an increase in the operating voltage to the motor by way of an additional timing network. The increased voltage timing network comprises diode D1, resistors R3, R4, and R5, capacitor C3, neon lamp NE2 and photocells PC1 and PC2. Photocell PC2 is in series with resistor R2 to form a shunt resistance path around resistor R1 which operates to set the voltage on a second triac, triac 2. As long as photocell PC2 is not illuminated, its resistance will be large, on the order of millions of ohms and, consequently, will have little or no effect on the total resistance of the timing network composed of R1 and C1 and the voltage applied to the motor in the soft start mode. Upon illumination of photocell PC2, by neon lamp NE2, the resistance of the network drops to a low value and the total resistance of the timing network composed of R1 and C1 is reduced, causing triac 2 to fully conduct which removes the soft start voltage and applies normal or running voltage to motor M2. The resistance value of resistor R2 can be prechosen to give any suitable voltage applied to motor M2 in this full on or running phase.

The invention also provides a means to maintain the either conduction or dark condition of the neon lamp NE2. The neon lamp NE2 is kept non-conducting or dark during the soft start interval provided by diode D1, resistor R3, resistor R4 and resistor R5, capacitor C3 and photocell PC1. The capacitor C3 is charged by diode D1 and resistor R4 and prevents firing voltage from appearing across neon lamp NE2 until the time period RC is reached. When capacitor C3 is charged to a voltage sufficient to ionize the neon lamp NE2, it conducts or fires. Capacitor C3 now discharges through the conducting lamp keeping it on long enough for photocells PC1 and PC2 to be illuminated. As long as PC1 is illuminated the voltage to lamp NE2 will be maintained and the lamp NE2 latches into the on or continuous glow mode. Triac 2 then conducts in the full run mode and shuts off the start voltage to motor M2. Resistors R3, R4 and photocell PC1 combine to limit the current to the neon lamp NE2. Resistor R5 is suitably chosen to discharge capacitor C3 when power to the system is removed. This resistor resets the timing network R4-C3 to zero voltage.

The invention provides a voltage isolation of the permanent magnet motor from the power handling or controlling circuits. The use of a lamp and photocells to control the voltage or soft start of a permanent magnet motor has the effect of providing isolation from the triac, diac or power rectifiers typically used in the power handling circuits.

The following table lists component values as employed in one embodiment of the invention.

TABLE

| | |
|---|---|
| R1 | Resistor 80.6K ohm |
| R2 | Resistor 5.36K ohm |
| R3 | 100K ohm |
| R4 | Resistor 220K ohm |
| R5 | Resistor 3.0 meg. ohm |
| R6 | Resistor 100 ohm |
| R7 | Resistor 100 ohm |
| R8 | Resistor 100 ohm |
| R9 | Resistor 100 ohm |
| C1 | Capacitor .1 Mfd. |
| C2 | Capacitor .01 Mfd. |
| C3 | Capacitor .47 Mfd. |
| C4 | Capacitor .01 Mfd. |
| D1 | Diode 1N4005 |
| CR1,2,3,4 | Rectifier. full wave bridge |
| Triac 1 | SC160D Bidirectional triode thyristor |
| Triac 2 | SC160D Bidirectional triode thyristor |
| Triac 3 | SC160D Bidirectional triode thyristor |
| Diac | ST2 Bidirectional diode thyristor |
| Vactrol | VTL9B8/2 Neon lamp and dual photocell |
| NE1 | Neon lamp indicator |
| R9 | Resistor (current limiter for Neon lamp) |
| M1 | Motor Vacuum (A.C.) |
| M2 | Motor Pump (D.C.) |
| S1 | Switch on-off (pump) |
| S2 | Switch low level float |
| S3 | Switch on-off (vacuum) |
| S4 | Switch high level float |
| GFCI | Personal Protector Ground Fault Circuit Interruptor |
| Circuit Brkr. | Resettable circuit breaker 15 ampere |
| Circuit Brkr. | Resettable circuit breaker 5 ampere |

Having described one aspect of the invention, the remote switching capabilities of the invention will now be described. As can be seen in the sole FIGURE, triac 1 is shunted by snubber network R8 and C4 and it is in series with a full wave bridge rectifier CR1, 2, 3, 4 and triac 2. Diode D1 is connected to a main terminal junction 10 of triac 1 and the A.C. leg of the full wave bridge rectifier CR1, 2, 3, 4. A.C. power cannot be applied to the soft start circuit PC1 and PC2 or the motor as long as the triac 1 is deactivated. Triac 1 is controlled by switches S1 and S2 in the gate circuit. Resistor R7 is a current limiting resistor for the gate of the triac and switches S1 and S2.

Switch S2 is a safety switch. For example, switch S2 could be an integral part of a float safety switch.

An example of the invention being used in a pump motor system for continuous flow recycling is one example of its potential benefits. If the switch S2 were directly connected to the soft start circuit and the triac 2 motor control circuit, and the switch S2 was in a position easily accessed by the user, motor demagnetization can occur. For example, if a float switch S2 were connected directly to the gate of triac 2, rapid rising and lowering of the float switch, either by hand or by wave motion in a water tank would turn triac 2 on and off in rapid succession. With the soft start circuit directly connected to the power source, neon lamp NE2 would never extinguish and, consequently, motor M2 would receive maximum voltage at start up in turn allowing demagnetizing inrush amperes to the motor. As a further illustration, a further advantage of remote switching provided by triac 1 is to allow the use of a small low power switch S1 and S2, because of the minimal gate current required by the triac 1 for turn on. With triac 1 and triac 2 in series with the rectifier CR1, 2, 3, 4, maximum voltage withstanding capability of the circuit is doubled.

This invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. A circuit for controlling the voltage to a motor system including a permanent magnet D.C. moor connected between legs of a full bridge rectifier, said circuit comprising:

a power supply means for applying power to a first leg of a full bridge rectifier of a motor system, said motor system including a permanent magnet D.C. motor and said full bridge rectifier;

a first triac means connected to a second leg of the full bridge rectifier;

a diac means connected to provide a diac output to the triac means;

a first timing network including a first resistance and a first capacitance, said first timing circuit being connected to the second leg and to the diac means to provide a control voltage to the diac means;

a second timing circuit including a second capacitance and a second resistance connected to the power supply means for charging the second capacitance responsive to actuation of the power supply means;

an illumination source connected to the power supply means to receive a firing voltage in response to actuation of the power supply means, said illumination source further being connected in parallel with the second capacitance, thereby to receive said firing voltage only after the charging of the second capacitance;

a first photocell positioned to receive light from the illumination source and a third resistance, connected in series as a shunt resistance path around said first resistance; and a means for maintaining the firing voltage across the illumination source, for as long as the power supply means remains actuated after said actuation;

wherein said first timing network, when the first photocell is not receiving light from the illumination source, has a total resistance determined substantially by the first resistance and provides a first level of said control voltage to the diac means and causes a corresponding first diac output to the first triac means, substantially inhibiting the first triac means from conducting current, to apply a soft start voltage to the motor system; and wherein said first photocell, when receiving light from the illumination source, shunts current to reduce said total resistance, to provide a second level of said control voltage and a corresponding second diac output to the first triac means, said second diac output being at a higher voltage than said first diac output and enabling the first triac means to conduct current, thereby to apply a full running voltage to the motor system.

2. The circuit of claim 1 wherein:

said means for maintaining the firing voltage includes a second photocell positioned to receive light from the illumination source and connected in series with a fourth resistance between said power supply means and the illumination source.

3. The circuit of claim 2 wherein:

said second resistance and fourth resistance are connected to the power supply means through a diode.

4. The circuit of claim 2 further including:

a fifth resistance connected in parallel with second capacitance, for discharging the second capacitance when the power supply mean is no loner actuated.

5. The circuit of claim 2 wherein:

said power supply means is remote and comprises a second triac means, a snubber network connected to operate as a shunt for the second triac means, and a switching means connected to actuate the second triac means.

6. The circuit of claim 5 wherein:

said snubber network comprises a sixth resistance and a third capacitance connected in series.

7. The circuit of claim 6 wherein:

said switching means comprises first and second switches connected in series.

8. The circuit of claim 7 wherein:

said second switch comprises a float switch.

9. The circuit of claim 5 wherein:

said first and second triac means comprise bidirectional triode thyristors.

10. The circuit of claim 1 wherein:

said first triac means comprises a bidirectional triode thyristor.

11. The circuit of claim 10 wherein:

said diac means comprises a bidirectional diode thyristor.

12. The circuit of claim 10 wherein:

said illumination means comprises a neon lamp.

13. The circuit of claim 1 wherein:

said diac means comprises a bidirectional diode thyristor.

14. The circuit of claim 1 wherein:

said illumination means comprises a neon lamp.

* * * * *